US012586020B2

(12) United States Patent
Monson et al.

(10) Patent No.: US 12,586,020 B2
(45) Date of Patent: Mar. 24, 2026

(54) DETERMINING IMPACTS OF WORK ITEMS ON REPOSITORIES

(71) Applicant: International Business Machines Corporation, Armonk, NY (US)

(72) Inventors: Thomas Kenneth Monson, Chicago, IL (US); Hitheshwar Peddamekala, Glen Allen, VA (US); Evelio Sosa, Raleigh, NC (US); Emily Otero, Durham, NC (US); Keith Gregory Frost, Delaware, OH (US)

(73) Assignee: International Business Machines Corporation, Armonk, NY (US)

( * ) Notice: Subject to any disclaimer, the term of this patent is extended or adjusted under 35 U.S.C. 154(b) by 152 days.

(21) Appl. No.: 18/381,988

(22) Filed: Oct. 19, 2023

(65) Prior Publication Data

US 2025/0131356 A1 Apr. 24, 2025

(51) Int. Cl.
| | |
|---|---|
| *G06Q 10/0633* | (2023.01) |
| *G06F 8/71* | (2018.01) |
| *G06F 40/40* | (2020.01) |

(52) U.S. Cl.
CPC ......... G06Q 10/0633 (2013.01); G06F 40/40 (2020.01); G06F 8/71 (2013.01)

(58) Field of Classification Search
None
See application file for complete search history.

(56) References Cited

U.S. PATENT DOCUMENTS

| | | | |
|---|---|---|---|
| 8,984,485 B2 | 3/2015 | Elshishiny et al. | |
| 11,064,074 B2 | 7/2021 | Erhart et al. | |
| 11,100,438 B2 | 8/2021 | Somech et al. | |
| 11,610,145 B2 | 3/2023 | Rogynskyy et al. | |
| 2016/0357519 A1 | 12/2016 | Vargas | |
| 2018/0114177 A1 | 4/2018 | Somech et al. | |
| 2019/0026697 A1* | 1/2019 | Burton | G06Q 10/103 |
| 2019/0347282 A1* | 11/2019 | Cai | G06N 5/022 |
| 2020/0089761 A1* | 3/2020 | Guerra | G06F 40/30 |
| 2020/0387819 A1 | 12/2020 | Rogynskyy et al. | |
| 2021/0029249 A1 | 1/2021 | Erhart et al. | |
| 2022/0004479 A1* | 1/2022 | McCawley | G06F 9/542 |

OTHER PUBLICATIONS

Catolino, et at., "Not all bugs are the same: Understanding, characterizing, and classifying bug types," 2019, The Journal of Systems and Software, vol. 152, pp. 165-181 (Year: 2019).*

(Continued)

*Primary Examiner* — Ivan R Goldberg
(74) *Attorney, Agent, or Firm* — Zilka-Kotab, P.C.

(57) ABSTRACT

A computer-implemented method, according to one approach, includes: receiving a new work item, and extracting topics from the new work item. A trained machine learning model is used to determine a first set of values representing correlation strengths between the new work item and the topics. Moreover, the first set of values are compared to a second set of values, where the second set of values represents correlation strengths between the topics and multiple files. A third set of values representing correlation strengths between the new work item and the multiple files is also generated, and output.

18 Claims, 7 Drawing Sheets

300

302 — Receive a new work item

304 — Extract topics from the new work item

306 — Use a trained machine learning model to evaluate the work item

308 — Compare the first set of confidence scores to a second set of confidence scores 310 — Generate a third set of values representing correlation strengths between the new work item and multiple files 312 — Evaluate the generated third set of values 314 — Output the third set of values 316 — Preprocess files determined as being associated with the new work item

(56) References Cited

OTHER PUBLICATIONS

Jeswani, et al, "Minimizing latency in serving requests through differential template caching in a cloud," 2012, In 2012 IEEE Fifth International Conference on Cloud Computing, pp. 269-276 (Year: 2012).*

Panichella et al., "How to Effectively Use Topic Models for Software Engineering Tasks? An Approach Based on Genetic Algorithms," 35th International Conference on Software Engineering, May 2013, 10 pages, retrieved from https://www.researchgate.net/publication/236889203_How_to_Effectively_Use_Topic_Models_for_Software_Engineering_Tasks_An_Approach_Based_on_Genetic Algorithms.

Dit et al., "Configuring Topic Models for Software Engineering Tasks in TraceLab," IEEE International Workshop on Traceability in Emerging Forms of Software Engineering (TEFSE), Jun. 2013, pp. 105-109.

Licorish et al., "Exploring software developers' work practices: Task differences, participation, engagement, and speed of task resolution," Information & Management, vol. 54, No. 3, 2017, 21 pages.

Liang et al., "TaskMatrix.AI: Completing Tasks by Connecting Foundation Models with Millions of APIs," arXiv, Mar. 2023, 27 pages, retrieved from https://arxiv.org/abs/2303.16434.

Stanley et al., "Distributed Ensemble Learning for Provisioning Indices, Actions an Inputs for Assurance and Performance," IP.com Prior Art Database, Technical Disclosure No. IPCOM000252743D, Feb. 6, 2018, 12 pages.

Anonymous, "System and Method to Use a Directed Graph and Artificial Intelligence to Identify a Public Cloud for Set of Objectives and Constraints," IP.com Prior Art Database, Technical Disclosure No. IPCOM000272162D, Apr. 24, 2023, 9 pages.

Github, "Your AI pair programmer," GitHub, 2022, 12 pages, retrieved from https://github.com/features/copilot.

Codescene, "4 key factors behind high-performing software development," CodeScene, 2023, 15 pages, retrieved from https://codescene.com/.

Sonar, "clean code for teams and enterprises with {SonarQube}," Sonar, 2023, 11 pages, retrieved from https://www.sonarsource.com/products/sonarqube/.

* cited by examiner

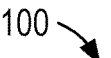

100

CLIENT COMPUTER  101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

IMPROVED WORK ITEM PROCESSING CODE

150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

FIG. 1

300

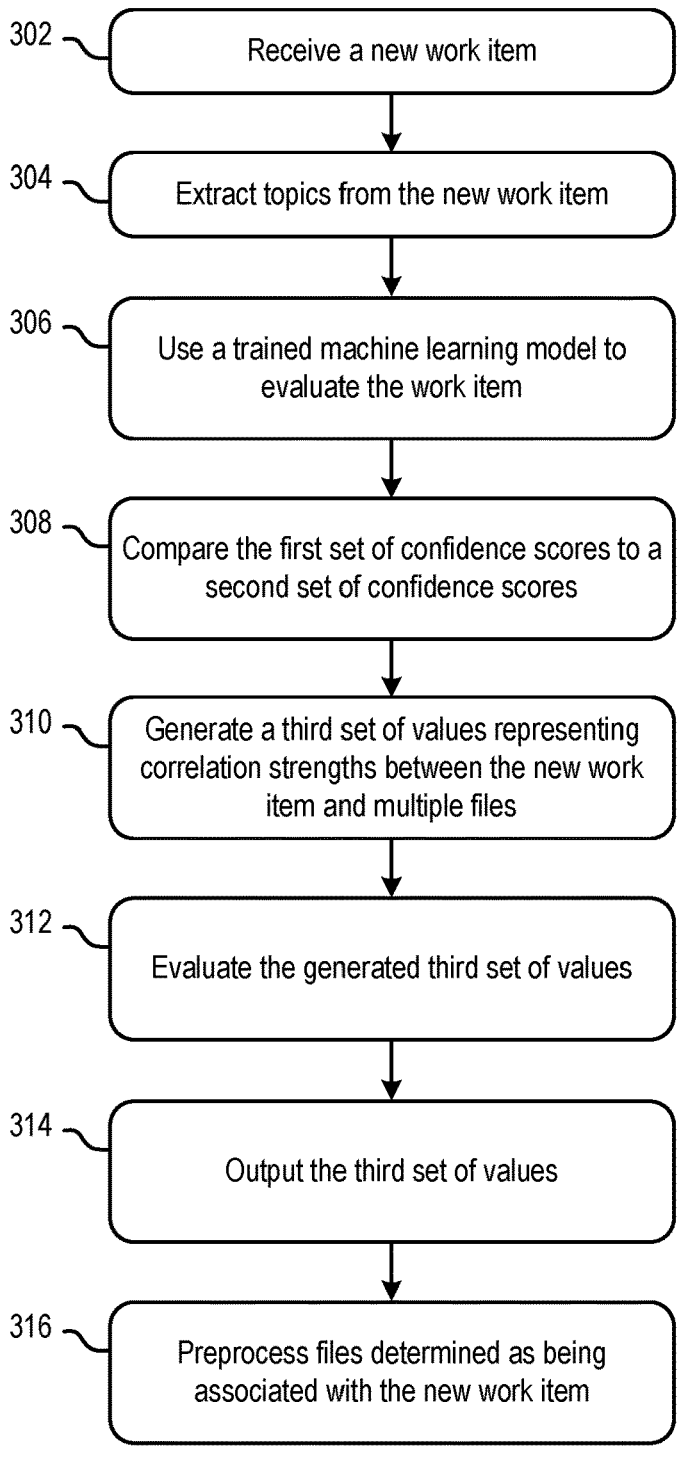

302 — Receive a new work item

304 — Extract topics from the new work item

306 — Use a trained machine learning model to evaluate the work item

308 — Compare the first set of confidence scores to a second set of confidence scores 310 — Generate a third set of values representing correlation strengths between the new work item and multiple files 312 — Evaluate the generated third set of values 314 — Output the third set of values 316 — Preprocess files determined as being associated with the new work item

FIG. 3A

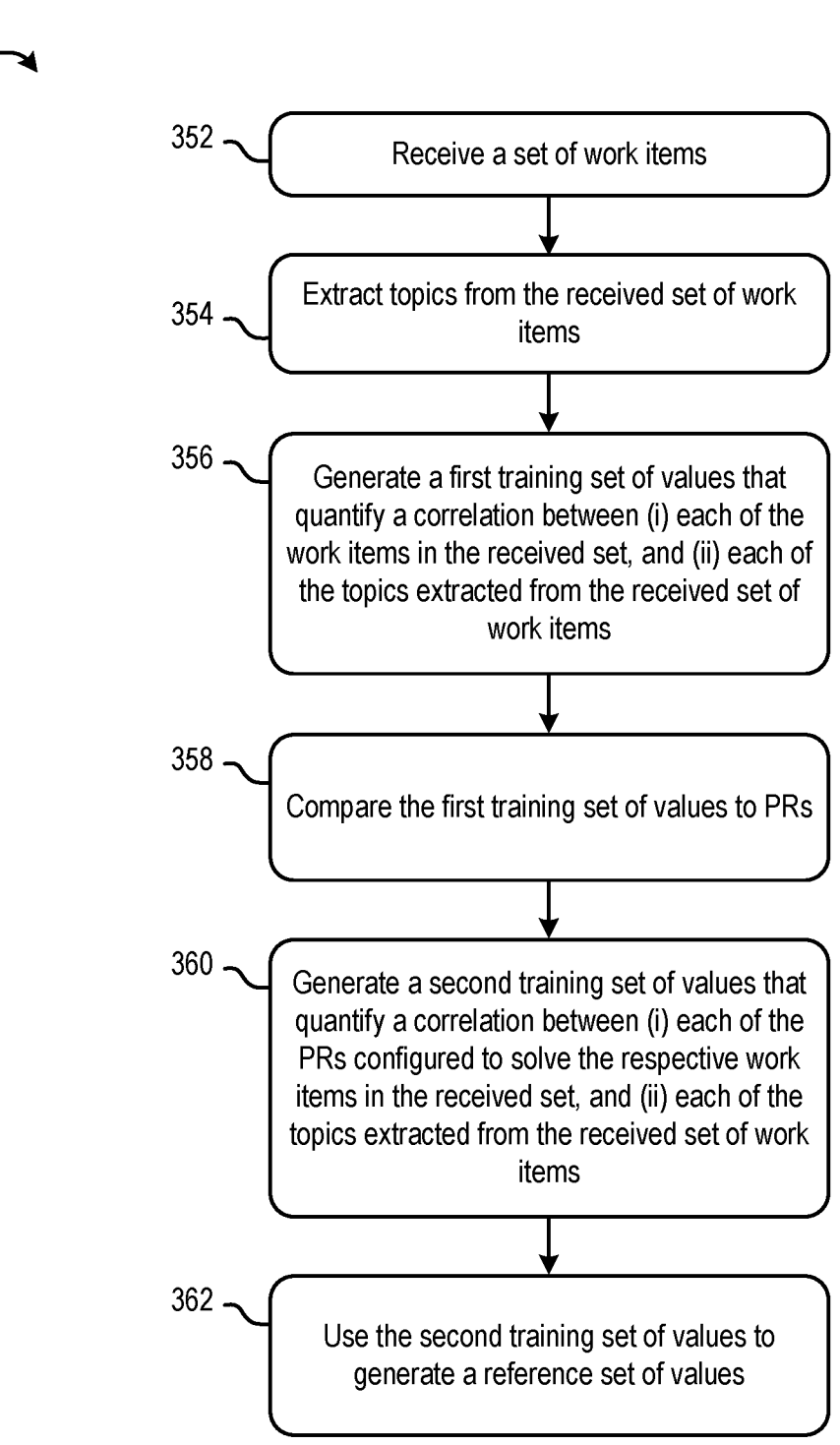

350

352 — Receive a set of work items

354 — Extract topics from the received set of work items

356 — Generate a first training set of values that quantify a correlation between (i) each of the work items in the received set, and (ii) each of the topics extracted from the received set of work items 358 — Compare the first training set of values to PRs 360 — Generate a second training set of values that quantify a correlation between (i) each of the PRs configured to solve the respective work items in the received set, and (ii) each of the topics extracted from the received set of work items 362 — Use the second training set of values to generate a reference set of values

FIG. 3B

DETERMINING IMPACTS OF WORK ITEMS ON REPOSITORIES

BACKGROUND

The present invention relates to electronic devices, and more specifically, this invention relates to interpreting work items and determining the relative impacts on a repository.

Electronic devices like mobile phones have continued to be adopted for a variety of situations in daily life. As electronic devices have become more advanced over time and gained functionality, they have been able to perform a wider array of actions. For instance, individuals can download software applications on their mobile phones. These software applications are each configured to utilize different characteristics of the mobile phones to perform specific actions.

The process of developing software that can perform these actions is an evolving process. It follows that data and software are continually being updated over time. These updates result from advances in technology, identified security threats, performance during use, etc. While some updates may be relatively straightforward, others may involve a significant number of modifications being made to a repository. This may be accomplished by traversing each of the relevant lines of code in each of the referenced files.

SUMMARY

A computer-implemented method, according to one approach, includes: receiving a new work item, and extracting topics from the new work item. A trained machine learning model is used to determine a first set of values representing correlation strengths between the new work item and the topics. Moreover, the first set of values are compared to a second set of values, where the second set of values represents correlation strengths between the topics and multiple files. A third set of values representing correlation strengths between the new work item and the multiple files is also generated, and output.

A computer program product, according to another approach, includes a computer readable storage medium having program instructions embodied therewith. The program instructions are readable by a processor, executable by the processor, or readable and executable by the processor, to cause the processor to: perform the foregoing method.

A system, according to yet another approach, includes: a processor, as well as logic that is integrated with the processor, executable by the processor, or integrated with and executable by the processor. Moreover, the logic is configured to: perform the foregoing method.

Other aspects and implementations of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one approach.

FIG. 3A is a flowchart of a method, in accordance with one approach.

FIG. 3B is a flowchart of a method, in accordance with one approach.

DETAILED DESCRIPTION

Figure 2A:
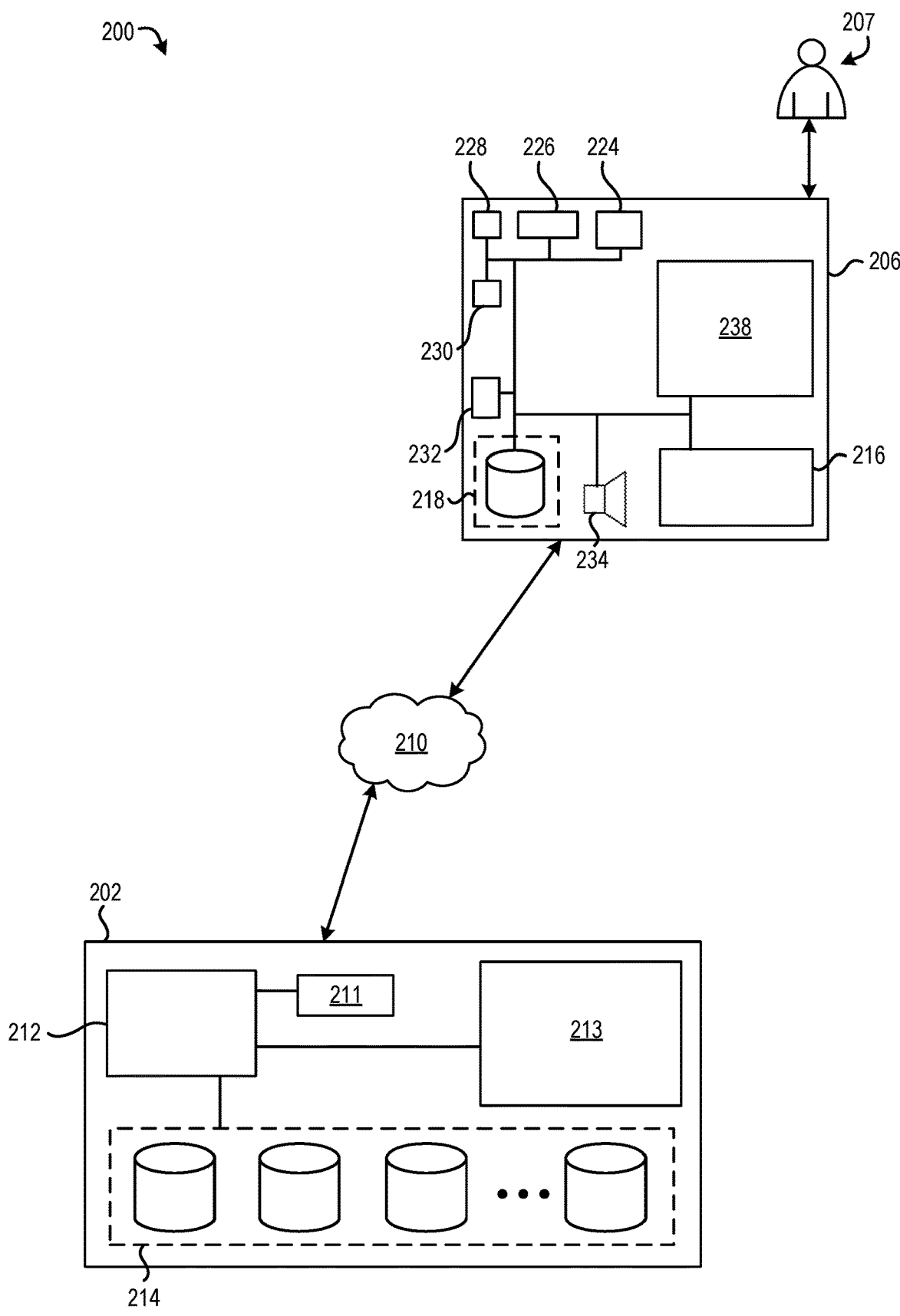
FIG. 2A is a representational view of a distributed system, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for automatically inspecting work items and developing a representation of how closely related the work item is to a number of different elements. In some instances, these representations may indicate how likely it is that each file will be modified, as well as how significantly the modification is expected to be for each respective file. Accordingly, implementations herein are able to predict certain files that will be impacted (e.g., accessed and modified) as a result of performing one or more PRs to solve one or more corresponding work items. Moreover, by continuing to train (e.g., update) the machine learning models used to evaluate work items and make correlations with topics in the work item descriptions, efficient performance is maintained and changes in work items are adapted to in real-time, e.g., as will be described in further detail below.

In one general approach, a computer-implemented method includes: receiving a new work item, and extracting topics from the new work item. A trained machine learning model is used to determine a first set of values representing correlation strengths between the new work item and the topics. Moreover, the first set of values are compared to a second set of values, where the second set of values represents correlation strengths between the topics and multiple files. A third set of values representing correlation strengths between the new work item and the multiple files is also generated, and output.

In another general approach, a computer program product includes a computer readable storage medium having program instructions embodied therewith. The program instructions are readable by a processor, executable by the processor, or readable and executable by the processor, to cause the processor to: perform the foregoing method.

In yet another general approach, a system includes: a processor, as well as logic that is integrated with the processor, executable by the processor, or integrated with and executable by the processor. Moreover, the logic is configured to: perform the foregoing method.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approaches ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved work item processing code at block 150 for automatically inspecting work items and developing a representation of how closely related the work item is to a number of different elements.

In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various implementations.

As noted above, data and software are continually being updated over time. These updates result from advances in technology, identified security threats, performance during use, etc. While some updates are relatively straightforward, others may involve a significant number of modifications being made to a codebase. This may be accomplished by traversing each of the relevant lines of code in each of the referenced files.

For instance, software companies frequently hire new developers and the onboarding process for these new hires can be particularly difficult and time consuming. For instance, a significant amount of time is spent looking through a codebase to understand how phrases used relate to code constructs. According to an example, in the description of a GitHub issue, the author might reference "the payment processing system" or "the products page." A new developer would not know the mapping of how those concepts relates to the code in the codebase. As a result, the new developer spends a significant amount of time navigating through the filesystem of the codebase, looking for names of files or variables that are similar to the natural-language terms that are used in the issue description. It follows that the conventional procedure for satisfying work items suffers from significant inefficiencies.

In sharp contrast to these conventional shortcomings, implementations herein are able to automatically inspect work items and indicate the likelihood that certain files in a repository will be modified as a result of the work item being satisfied. For instance, implementations herein develop and/or apply machine learning models that are trained to generate a representation of how closely related each of the different files are to a work item, e.g., as will be described in further detail below.

Looking now to FIG. 2A, a system 200 having a distributed architecture is illustrated in accordance with one approach. As an option, the present system 200 may be implemented in conjunction with features from any other approach listed herein, such as those described with reference to the other FIGS., such as FIG. 1. However, such system 200 and others presented herein may be used in various applications and/or in permutations which may or may not be specifically described in the illustrative approaches or implementations listed herein. Further, the system 200 presented herein may be used in any desired environment. Thus FIG. 2A (and the other FIGS.) may be deemed to include any possible permutation.

As shown, the system 200 includes a central server 202 that is connected to an electronic device 206 accessible to the user 207. The electronic device 206 and central server 202 may thereby be separated from each other such that they are positioned in different geographical locations. For instance, the central server 202 and electronic device 206 are connected to a network 210.

The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. As a result, any desired information, data, commands, instructions, responses, requests, etc. may be sent between user 207 and central server 202 using the electronic device 206, regardless of the amount of separation which exists therebetween, e.g., despite being positioned at different geographical locations.

However, it should be noted that two or more of the electronic device 206 and/or central server 202 may be connected differently depending on the approach. According to an example, which is in no way intended to limit the invention, edge compute nodes may be located relatively close to each other and connected by a wired connection, e.g., a cable, a fiber-optic link, a wire, etc.; etc., or any other type of connection which would be apparent to one skilled in the art after reading the present description. The term "user" is in no way intended to be limiting either. For instance, while users are described as being individuals in various implementations herein, a user may be an application, an organization, an information technology (IT) department, a preset process, etc. The use of "data," "files," and "information" herein is in no way intended to be limiting either, and may include any desired type of details, e.g., depending on the type of software (e.g., program) being evaluated.

With continued reference to FIG. 2A, the electronic device 206 and central server 202 are shown as having different configurations. For example, the central server 202 includes a large (e.g., robust) processor 212 coupled to a cache 211, a machine learning module 213, as well as a data storage array 214 having a relatively high storage capacity. The machine learning module 213 may include any desired number and/or type of machine learning models.

In preferred approaches, the machine learning module 213 includes machine learning models that have been trained to evaluate an input set of work items, and extract relevant information which may be used to interpret the work items. Accordingly, in some approaches the machine learning module 213 may be used to extract topics from work items that are downloaded over network 210, received from electronic device 206, loaded from data storage array 214, etc. The machine learning module 213 at a central server 202 may thereby be used in some implementations to interpret the information included in each work item, by performing one or more of the operations in method 300, e.g., as will be described in further detail below.

With continued reference to FIG. 2A, electronic device 206 includes a processor 216 coupled to memory 218. The processor 216 is also connected to a display screen 224, a computer keyboard 226, a computer mouse 228, a microphone 230, a camera 232, and an audio speaker 234. Accordingly, the processor 216 may receive inputs from user 207 using one or more of: the display screen 224 (e.g., using keys of a virtual computer keyboard, a touch screen, etc.), the computer keyboard 226, the computer mouse 228, the microphone 230, and/or the camera 232. The processor 216 may thereby be configured to receive inputs (e.g., text, sounds, images, motion data, etc.) from any of the components in electronic device 206, as entered by the user 207. These inputs typically correspond to information presented on the display screen 224 while the entries were received. Moreover, the inputs received may impact the information shown on display screen 224, data stored in memory 218, information collected from the microphone 230 and/or camera 232, status of an operating system being implemented by processor 216, etc.

Electronic device 206 also includes a machine learning module 238 which may be used to evaluate received work items. Machine learning module 238 may communicate with machine learning module 213 at central server 202 over network 210. Accordingly, machine learning module 238 may include the same or similar models as machine learning module 213. Machine learning module 238 may thereby include machine learning models that have been trained to evaluate an input set of work items, and extract relevant information which may be used to interpret the work items. In preferred approaches, the machine learning module 238 includes machine learning models that have been trained to interpret the information included in each work item, by performing one or more of the operations in method 300 below, e.g., as will be described in further detail below.

Figure 2B:
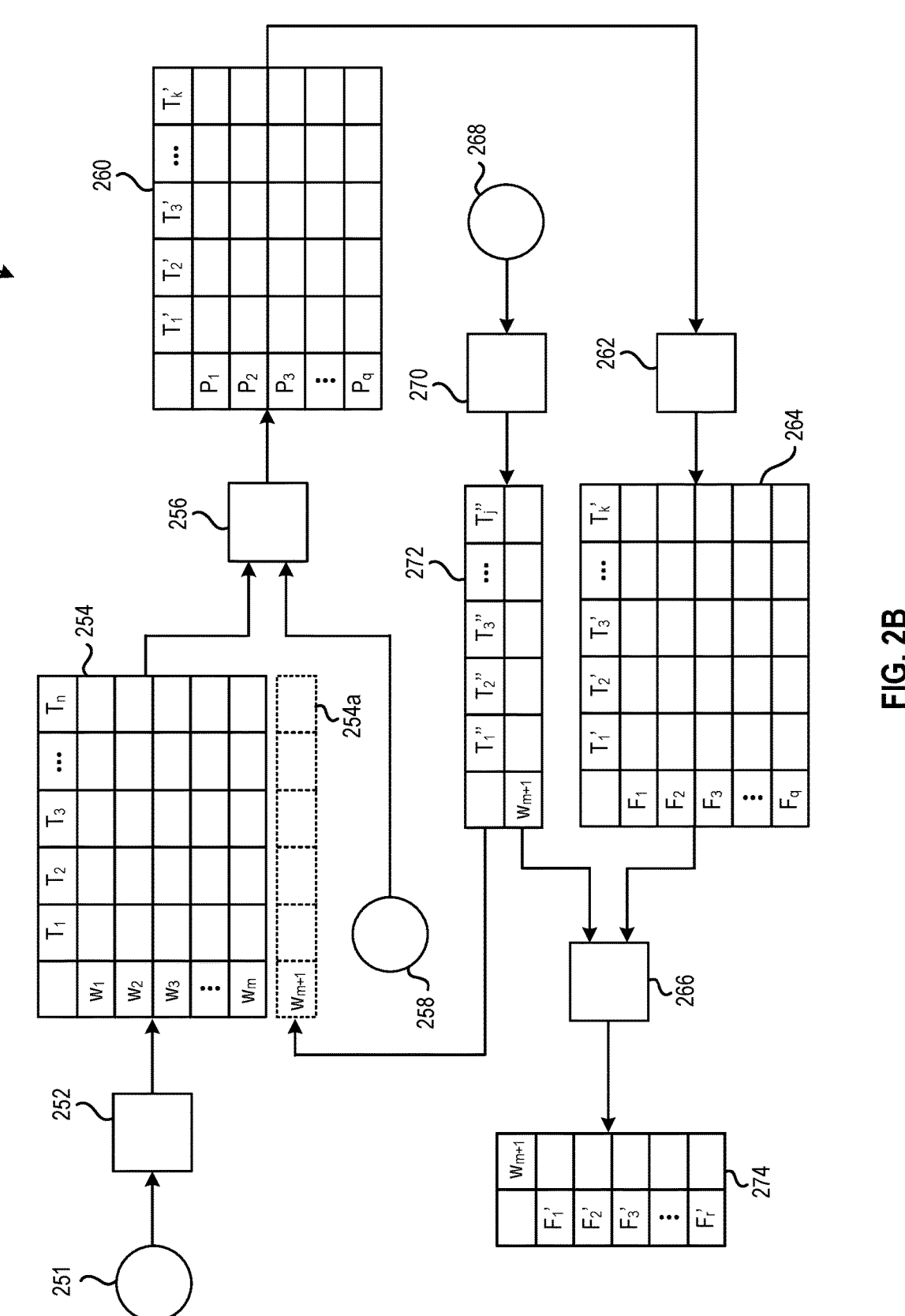
FIG. 2B is a partial representational view of a sub-system, in accordance with one approach.

Looking now to FIG. 2B. a sub-system 250 is illustrated in accordance with one approach. As an option, the present sub-system 250 may be implemented in conjunction with features from any other approach listed herein, such as those described with reference to the other FIGS., such as FIGS. 2A and 3A-3B. However, such sub-system 250 and others presented herein may be used in various applications and/or in permutations which may or may not be specifically described in the illustrative approaches or implementations listed herein. Further, the sub-system 250 presented herein may be used in any desired environment. Thus FIG. 2B (and the other FIGS.) may be deemed to include any possible permutation.

As shown, the sub-system 250 receives a set of work items 251, and inputs the set of work items into a topic module 252. In some approaches, the received set of work items 251 includes training data received from one or more repositories. Accordingly, the set of work items 251 may be used to train the topic module 252 to evaluate the input set of work items, and extract relevant information which may be used to interpret the work items. Depending on the approach, the received set of work items 251 may be used to train the topic module 252 in a supervised, unsupervised, semi-supervised, etc., manner. Moreover, the received set of work items 251 may be applied differently depending on the type of models implemented by the topic module 252.

The topic module 252 is preferably configured to evaluate the input set of work items, and extract relevant information which may be used to interpret the work items. For example, the topic module 252 may be configured to implement one or more natural language processing models that are able to interpret the received set of work items. In other words, the natural language processing models may be used to analyze the received work items and determine what tasks (e.g., operations) the received set of work items involve performing.

Accordingly, the natural language processing models may parse the received set of work items into semantically meaningful phrases. The models may also be used to determine a topic associated with each of the parsed phrases. With respect to the present description, a "topic" includes a general category that encapsulates the corresponding parsed phrase. For example, parsed phrases determined as having a same or similar topic may involve solving similar issues, performing similar requests, etc. It follows that multiple different work items may correspond to (e.g., fall under) a same topic. The topic module 252 is thereby preferably able to identify each of the topics in a work item set.

The topic module 252 is also configured to compare each of the work items in the set with the identified topics. For instance, topic module 252 is shown as generating matrix 254 which compares each of "m" different work items "W," to the "n" different topics "T" extracted from the received set of work items 251. It follows that each cell in the matrix 254 may include a value generated to represent how similar each of the different work items are to the respective topics.

According to an example, which is in no way intended to limit the invention, matrix 254 may be formed such that each cell therein includes a value for the variable "x," where the possible values of x may be represented as $0 \leq x \leq 1$. In some approaches, a value closer to 1 may indicate (e.g., correspond to) a strong correlation between the respective work item and topic pair, while a value that is closer to 0 represents a weak correlation for the respective pair. However, in other approaches a value closer to 0 may indicate a strong correlation between the respective work item and topic pair, while a value closer to 1 represents a weak correlation for the respective pair. In still other approaches, a different range of values may be used in the matrix 254, e.g., depending on user input, a type of work items received, past performance, etc.

It follows that matrix 254 correlates each of the work items in the set, with each of the topics extracted from the set. The values in each cell of the matrix 254 thereby indicate how relevant each topic is to each of the work items received in the set 251, allowing the 2-dimensional array to map the different work items to the extracted topics. These values in the cells of matrix 254 may thereby be considered to be confidence scores that indicate how likely it is that a given work item does correspond to a given topic when performed.

The matrix 254 is input into a confidence weighting module 256, along with a pull request (PR) set 258. The PR set 258 includes a number of PRs which are able to solve each of the respective work items in the set 251 received. However, the PR set 258 may also include a number of PRs that are at least somewhat related to each of the work items. For instance, in addition to comparing each of the topics to the work items that are directly solved by the PRs received in the PR set 258, parent work items and/or PRs are also taken into consideration.

Work items can be nested in some implementations such that a given work item has a collection of other work items that are related to it. According to an example, some approaches implement Agile methodology which allows for work items to be categorized as epics, stories, or tasks, where epics are very large work items that can be broken down into a number of stories and stories are medium work items that can be broken down into a number of tasks. Some work items also depend on the results of other work items, where the result (e.g., output) of a "parent" work item may be used as an input for a "child" work item, thereby building a hierarchy for related work items having an arbitrary number of levels (e.g., depth). Work items are thereby described herein as having a "depth" relative to a PR, where a work item is considered to have a depth of 1 relative to a PR that it actually satisfies. Moreover, a parent work item has a depth of 2 relative to a PR which solves one of its child work items.

It follows that the confidence weighting module 256 also incorporates (e.g., evaluates) work items related to each of those that are received in matrix 254. Similarly, the PR set 258 may include a number of PRs which are able to solve each of the related (e.g., parent, child, etc.) work items. For instance, the confidence weighting module 256 generates topic confidence values for a PR by combining the topic confidences of the work item the PR solves, as well as any related (e.g., preceding) work items.

The topic confidence values may further be weighted. For example, in some approaches the topic confidence values are weighted more heavily for work items that are more closely related to a given PR. In other words, if a work item is narrower in scope and more closely related to the changes that result from conducting a PR, the topics which correspond to that work item are likely also more relevant to that PR. This is particularly true in comparison to a work item that is broader and more distantly related to the results achieved by a PR. The confidence weighting module 256 is thereby able to compare each of the PRs to work items they solve, along with any corresponding topic confidence scores.

The confidence weighting module 256 is thereby able to create an updated matrix 260 which compares each of the "k" different identified topics "T"' to the "q" different PRs "P" received. It follows that the identified topics, as well as the topic confidence values in the cells of the matrix 260, are extracted from the work items that the PR solved directly, in addition to related work items (e.g., children, parents, grandparents, great-grandparents, etc.). Each of the cells in the updated matrix 260 thereby include an updated confidence score.

The updated matrix 260 is further passed to a file-to-topic association module 262 that correlates each of the identified topics to files (e.g., information) in memory. The file-to-topic association module 262 is thereby able to generate a matrix 264 comparing each of the "k" different topics "T"' to a number "q" of different files "F." The file-to-topic association module 262 is able to inspect a PR and determine the map of the file path that corresponds to the changes that occur as a result of implementing the PR. In other words, the file-to-topic association module 262 is able to determine the file(s) a PR modifies and/or creates, as well as the amount of change that happened in the file(s).

It should be noted that with respect to the present description, a "file" may include any desired collection of information. For example, in some implementations a file includes a number of lines of code in a codebase stored in memory. In such implementations, a PR may be a patch that modifies a portion (e.g., lines of code) of the codebase to achieve a desired result, such as solving a work item.

Accordingly, the matrix 264 is able to associate each of the topics with existing files using confidence scores in each of the cells. Matrix 264 compares the topics to files using a different set of confidence scores, in comparison to the set of confidence scores in matrix 260 used to correlate each of the topics with the various PRs. The PR objects may be used to develop the set of confidence scores included in matrix 264. For instance, PR objects may include information about the files they are configured to modify, e.g., such as the corresponding file paths, the number of lines in the file that are changed, etc. Thus, confidence scores in the cells of matrix 260 may be combined to generate a confidence score in matrix 264 for a given file "F" that is impacted by the PRs corresponding to the confidence scores combined from matrix 260.

Depending on the approach, any desired function may be applied to the information (e.g., values) combined to generate the entries in matrix 264 and/or other metrics in the sub-system 250, such as matrix 274. For example, confidence scores may be used to calculate an average value, a weighted average, a median value, standard deviation, etc. The confidence scores in matrix 264 may also depend on additional information. For example, the number of modifications a given PR involves making to a file impacts the likelihood that file will actually be accessed.

While the work items received in the initial set 251 may be used as training data for the topic module 252, confidence weighting module 256, file-to-topic association module 262, and topic-to-file association module 266, new work items may also be received. For example, a work item 268 may be received from a running application, a remote system, directly from a user, automatically in response to a predetermined condition being met, etc.

In response to receiving the new work item 268, it is passed to a topic module 270. The topic module 270 is preferably configured to evaluate the input work item, and extract relevant information which may be used to interpret the work item. For example, the topic module 270 may be configured to implement one or more natural language processing models that are able to interpret the received work item. In other words, the natural language processing models may be used to analyze the received work item and determine what tasks (e.g., operations) the received work item involves performing.

It follows that topic module 270 may implement any of the training and/or models developed by topic module 252. As noted above, topic module 252 may be trained to develop natural language processing models that are configured to parse one or more received work items into semantically meaningful phrases. The models may have also been trained to determine a topic associated with each of the parsed phrases. With respect to the present description, a "topic" includes a general category that encapsulates the corresponding parsed phrase. For example, parsed phrases determined as having a same or similar topic may involve solving similar issues, performing similar requests, etc. It follows that multiple different work items may correspond to (e.g., fall under) a same topic.

The topic module 270 is thereby also preferably able to identify each of the topics in the received work item 268. As shown, matrix 272 includes each of the "j" different topics "T" that are extracted from the received work item "$w_{m+1}$." Each of these topics are further correlated with the received work item "$w_{m+1}$" by each of the respective confidence score that are included in each cell of matrix 272. As noted above, these confidence scores (e.g., values) may be determined using any of the trained models developed herein and/or by combining confidence scores in other portions of the subsystem 250.

Matrices 264, 272 are further input into and topic-to-file association module 266. There, the topic-to-file association module 266 effectively operates in a reverse order compared to the file-to-topic association module 262. In other words, the topic-to-file association module 266 preferably compares the confidence scores in the matrices 264, 272, thereby generating an output matrix 274 that includes confidence scores for "r" different files "F'" that at least correspond to the received work item "$w_{m+1}$."

It follows that each cell in the matrix 274 may include a value generated to represent how closely related each of the different files are to the respective work item. Again, these values may represent how likely each file will be modified as well as how significantly the modification is expected to be. Accordingly, sub-system 250 is able to predict certain files that will be impacted (e.g., accessed and modified) as a result of performing one or more PRs to solve one or more corresponding work items.

As noted above, a PR effectively solves a work item, and therefore sub-system 250 is able to predict areas in memory which will be accessed during the course of satisfying a given work item. This allows for steps to be taken in preparation for satisfying the given work item. For example, certain information may be pre-loaded into cache, one or more sub-operations may be initiated, the identified files may be inspected to ensure they are not currently being accessed, etc. Sub-system 250 is again thereby able to more efficiently satisfy work items and improve overall operational performance.

Returning momentarily to matrix 272, it should also be noted that the confidence scores generated by topic module 270 are also preferably used to further train the existing models. Accordingly, newly received and/or generated information may be returned to matrix 254, e.g., as a feedback loop. For example, see newly added matrix 254*a*. This desirably allows for the models to be updated over time, thereby ensuring efficient performance of work items as they are received in real-time, e.g., as would be appreciated by one skilled in the art after reading the present description.

Now referring to FIG. 3A, a flowchart of a computer-implemented method 300 for evaluating incoming work items is shown according to one embodiment. The method 300 may be performed in accordance with the present invention in any of the environments depicted in FIGS. 1-2B, among others, in various embodiments. Of course, more or less operations than those specifically described in FIG. 3A may be included in method 300, as would be understood by one of skill in the art upon reading the present descriptions.

Each of the operations in method 300 may be performed by any suitable component of the operating environment using known techniques and/or techniques that would become readily apparent to one skilled in the art upon reading the present disclosure. For example, in some implementations one or more of the operations in method 300 may be performed by a sub-system having topic modules and confidence weighting modules (e.g., see sub-system 250 of FIG. 2B above). It follows that at least some of the operations in method 300 may correspond to the approaches described above with respect to FIG. 2B. In other implementations, one or more of the operations in method 300 may be performed by a controller and machine learning module (e.g., see processors 212, 216 and machine learning modules 213, 238 of FIG. 2A above). In various other implementations, the method 300 may be partially or entirely performed by a controller, a processor, etc., or some other device having one or more processors therein.

The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3A, operation 302 of method 300 includes receiving a new work item. The new work item may be received from a running application, a remote system, directly from a user, automatically in response to a predetermined condition being met, etc. The work item identifies a task to be completed using any desired type of information. For instance, the type of task to be completed may impact the amount and/or type of information that is included in the work item.

From operation 302, method 300 advances to operation 304. There, operation 304 includes extracting topics from the new work item. In preferred approaches, the work item may be passed to a topic module that is configured to evaluate the input work item, and extract relevant information which may be used to interpret the work item. It follows that in some instances, operation 304 may include sending one or more instructions to a topic module, resulting in the topics being extracted from the new work item, and returned.

According to an example, which is in no way intended to limit the invention, one or more natural language processing models are used to interpret the received work item. In other words, the natural language processing models may be used to analyze the received work item and determine topics that are related to the work items using semantic similarities, grammatical structure, etc., developed while evaluating training work item sets.

Moreover, operation 306 includes using a trained machine learning model to evaluate the work item in view of the extracted topics. The machine learning model may thereby be able to generate a first set of values (also referred to as "confidence scores"), each of which represent the correlation strength between the new work item and a respective one of the extracted topics. This first set of values may be represented differently depending on the implementation. For instance, the first set of values may be represented by a matrix that includes the various values (e.g., see matrix 272 in FIG. 2B). In other approaches, the first set of values may be transformed into a heat map that displays a relative "heat" or similarity a given topic has to the overall work item.

Proceeding to operation 308, the first set of confidence scores are compared to a second set of confidence scores. The second set of confidence scores includes values that represent the correlation strengths between various topics and files. In other words, the second set of confidence scores indicate how closely a given topic extracted from various work items, corresponds to a given file. This second set of confidence scores may be generated using one or more machine learning models that have been trained to evaluate intersections between topics and files in particular implementations. For example, a machine learning model may be trained on a given codebase as a result of applying testing data and evaluating the results. According to another implementation, the second set of confidence scores may be generated by a topic module (e.g., see 252 in FIG. 2B), a confidence weighting module (e.g., see 256 in FIG. 2B), a file-to-topic association module (e.g., see 262 in FIG. 2B), or any other components that may implement machine learning models capable of generating confidence scores that can be used to correlate incoming work items with files in a repository, e.g., as will soon become apparent.

From operation 308, method 300 advances to operation 310 where a third set of values representing correlation strengths between the new work item and the multiple files is generated. In other words, each value in the third set represents the correlation strength (e.g., similarity) between the new work item and a given one of multiple different files. The third set of values is generated based at least in part on the comparison performed in operation 308. For example, a topic-to-file association module may compare the available sets of confidence scores and make correlations between different factors. As a result, this topic-to-file association module is able to quantify a likelihood a given file in a repository with be impacted by the received work item. Again, this information may be presented in a number of different ways. For instance, in some approaches the values may be organized in a matrix, while in others the values may be presented visually on a display as a heat map.

Proceeding to operation 312, the generated third set of values are evaluated and compared to a predetermined range. As noted above, the third set includes values that represent the correlation strengths between the new work item and the respective files in a repository. In other words, the third set of values may be interpreted as indicating the likelihood that a given file with be impacted as a result of satisfying the received work item. With respect to the present description, "impact" on a file may be quantified to represent how likely each file will be modified as well as how significantly the modification is expected to be.

Accordingly, operations 310 and 312 are able to predict certain files that will be impacted (e.g., accessed and modified) as a result of performing one or more PRs to solve one or more corresponding work items. As noted above, a PR effectively solves a work item, and therefore operations 310 and 312 are able to predict areas in memory which will be accessed during the course of satisfying a given work item.

Results of these operations are preferably collected and output. See operation 314. For instance, the results may be used to form a collection of values that indicate the likelihood that each file in a repository will be impacted (e.g., modified). According to one approach, which is in no way intended to limit the invention, the values may be combined to form a heatmap. The heatmap may be converted into a visual form and displayed on a monitor, e.g., such that a user may view the distribution of predicted file impacts. It follows that operation 314 includes translating the third set of values into a different form before being output. For example, the third set of values may be translated into a user-friendly (e.g., visual) version before being output. The user may also use this information to perform preprocessing steps, e.g., such as access identified file locations, preload specific software, etc. This again improves performance of satisfying the work item, which allows for the overall system to operate more efficiently, e.g., as described herein.

Files with a higher likelihood of being impacted by the work item may be preprocessed to prepare them for the impact. See operation 316. For example, files determined as having a correlation strength with the new work item that is in a predetermined range, may be preloaded into cache. In other words, ones of the files determined as being sufficiently similar to the received work item are preloaded in preparation for performing the PR configured to satisfy the received work item. This reduces data access times while satisfying the new work item, thereby improving efficiency of the system overall. Moreover, these improvements in efficiency may further be used to update machine learning models used during the process. It follows that any desired information may be copied and used to dynamically update the machine learning models using performance data (e.g., see matrix 254a in feedback loop of FIG. 2B). Performance is thereby further improved in real-time and over time as work items are processed.

It follows that method 300 is able to generate a representation of how closely related each of the different files are to a work item. Again, these representations may indicate how likely it is that each file will be modified, as well as how significantly the modification is expected to be for each respective file. Accordingly, method 300 is able to predict certain files that will be impacted (e.g., accessed and modified) as a result of performing one or more PRs to solve one or more corresponding work items. Moreover, by continuing to train (e.g., update) the machine learning models used to evaluate work items and make correlations with topics in the work item descriptions, correlate work items with files in a repository, etc., efficient performance is maintained and changes in work items are adapted to in real-time.

Referring momentarily to FIG. 3B, a method 350 for training a machine learning model is shown in accordance with one embodiment. The method 350 may be performed in accordance with the present invention in any of the environments depicted in FIGS. 1-3A, among others, in various embodiments. Of course, more or less operations than those specifically described in FIG. 3A may be included in method 350, as would be understood by one of skill in the art upon reading the present descriptions.

Each of the operations in method 350 may be performed by any suitable component of the operating environment using known techniques and/or techniques that would become readily apparent to one skilled in the art upon reading the present disclosure. For example, in some implementations one or more of the operations in method 350 may be performed by a sub-system having topic modules and confidence weighting modules (e.g., see sub-system 250 of FIG. 2B above).

It follows that at least some of the operations in method 350 may correspond to the approaches described above with respect to FIG. 2B. In other implementations, one or more of the operations in method 350 may be performed by a controller and machine learning module (e.g., see processors 212, 216 and machine learning modules 213, 238 of FIG. 2A above). In various other implementations, the method 350 may be partially or entirely performed by a controller, a processor, etc., or some other device having one or more processors therein.

The processor, e.g., processing circuit(s), chip(s), and/or module(s) implemented in hardware and/or software, and preferably having at least one hardware component may be utilized in any device to perform one or more steps of the method 350. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3B, operation 352 of method 350 includes receiving a set of work items. The work items in the set may be received as training data, and may be labeled or unlabeled depending on the approach. Proceeding to operation 354, topics are extracted from the various work items in the received set. For instance, one or more natural language processing models may be used to extract topics from the received set of work items.

The extracted topics are compared to the various work items in the received set. Based on this comparison, a first training set of values may be generated. See operation 356. The values in the first training set are generated to represent the confidence scores that quantify a correlation between (i) each of the work items in the received set, and (ii) each of the topics extracted from the received set of work items.

Operation 358 further includes comparing the first training set of values to PRs configured to solve each of the respective work items in the received set. Based on this comparison, a second training set of values may be generated. See operation 360. The values in the second training set are generated to represent the confidence scores that quantify a correlation between (i) each of the PRs configured to solve the respective work items in the received set, and (ii) each of the topics extracted from the received set of work items. Operation 362 further includes using the second training set of values to generate a reference set of values. This "reference set" may reflect a current status of the files in a repository, and may thereby be compared against newly received work items (e.g., see matrix 264 of FIG. 2B).

Referring now to an in-use example, which is in no way intended to limit the invention, the pseudocode below may be used to determine the confidence weighting (e.g., confidence scores) for a given work item and corresponding PR.

```
PR {
id: string,
workItem: WorkItem,
fileChanges: Map<path: string, linesChanged: int>
}
WorkItem {
id: string,
description: string,
parentWorkItem: WorkItem
}
weightModifier: double // e.g. 0.5
workItemToTopicConfidences = new Map<string, new Map<string, double>>
prToTopicConfidences = new Map<PR, new Map<string, double>>
forEach workItem:
topicConfidences: Map<string, double> =
generateTopicConfidences(workItem.description)
workItemToTopicConfidences.put(workItem.id, topicConfidences)
getTopicConfidences(workItem, weight):
topicConfidences: new Map<string, double> =
workItemToTopicConfidences.get(workItem.id)
forEach (topic, confidence) in topicConfidences:
topicConfidences.put(topic, confidence * weight)
if workItem.parentWorkItem
forEach (parentTopic, parentConfidence) in
getTopicConfidences(parentWorkItem, weight * weightModifier):
topicConfidences.put(parentTopic, topicConfidences.get(parentTopic) +
parentConfidence)
return topicConfidences
forEach PR:
topicConfidences: Map<string, double> = getTopicConfidences(PR.workItem, 1)
prToTopicConfidences.put(PR.id, topicConfidences)
```

In some approaches, the pseudocode above may be implemented in conjunction with any of the approaches above described with respect to FIGS. 2A-3B, e.g., as would be appreciated by one skilled in the art after reading the present description.

Figure 4:
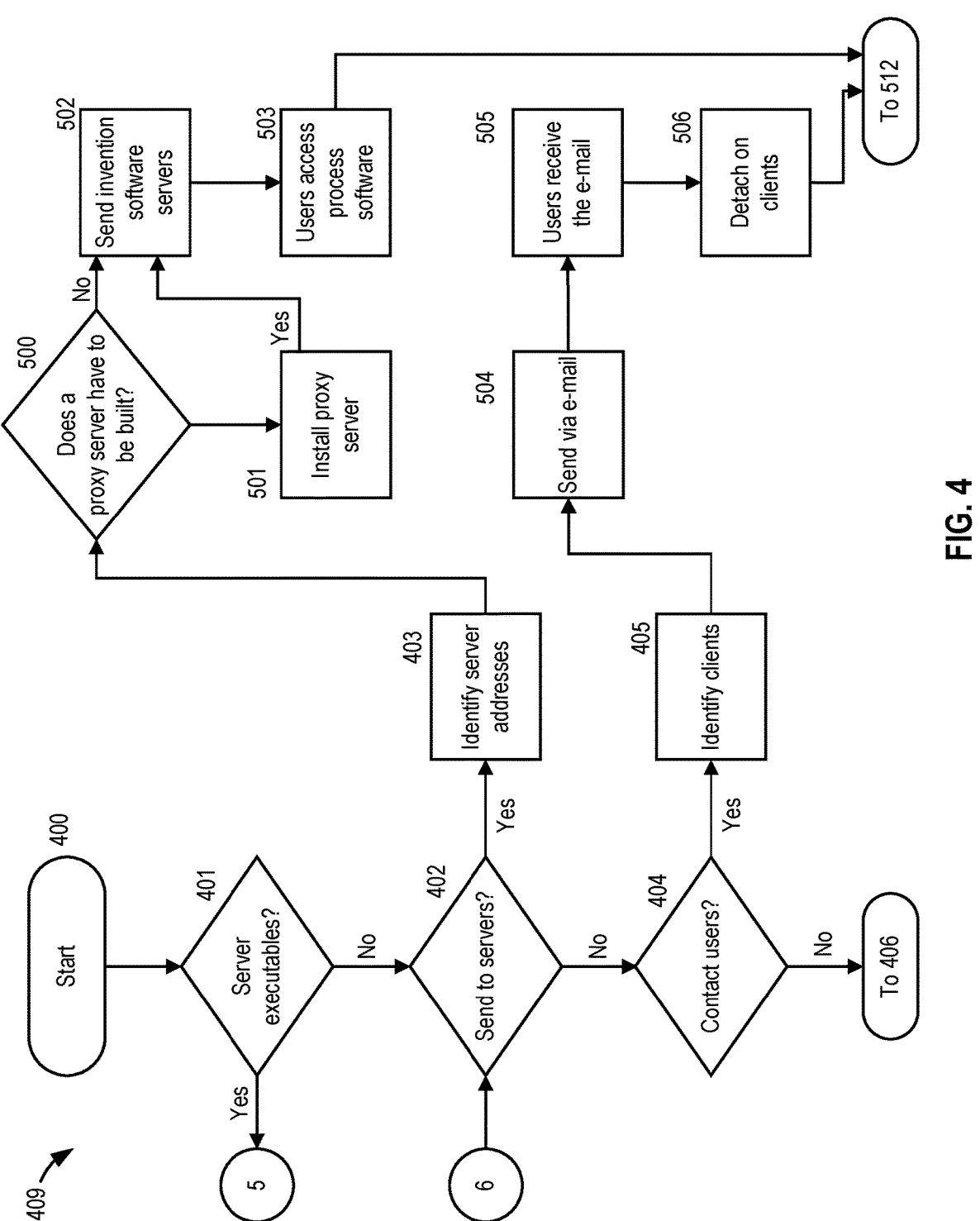
FIG. 4 is a flowchart of a method, in accordance with one approach.
Figure 4:
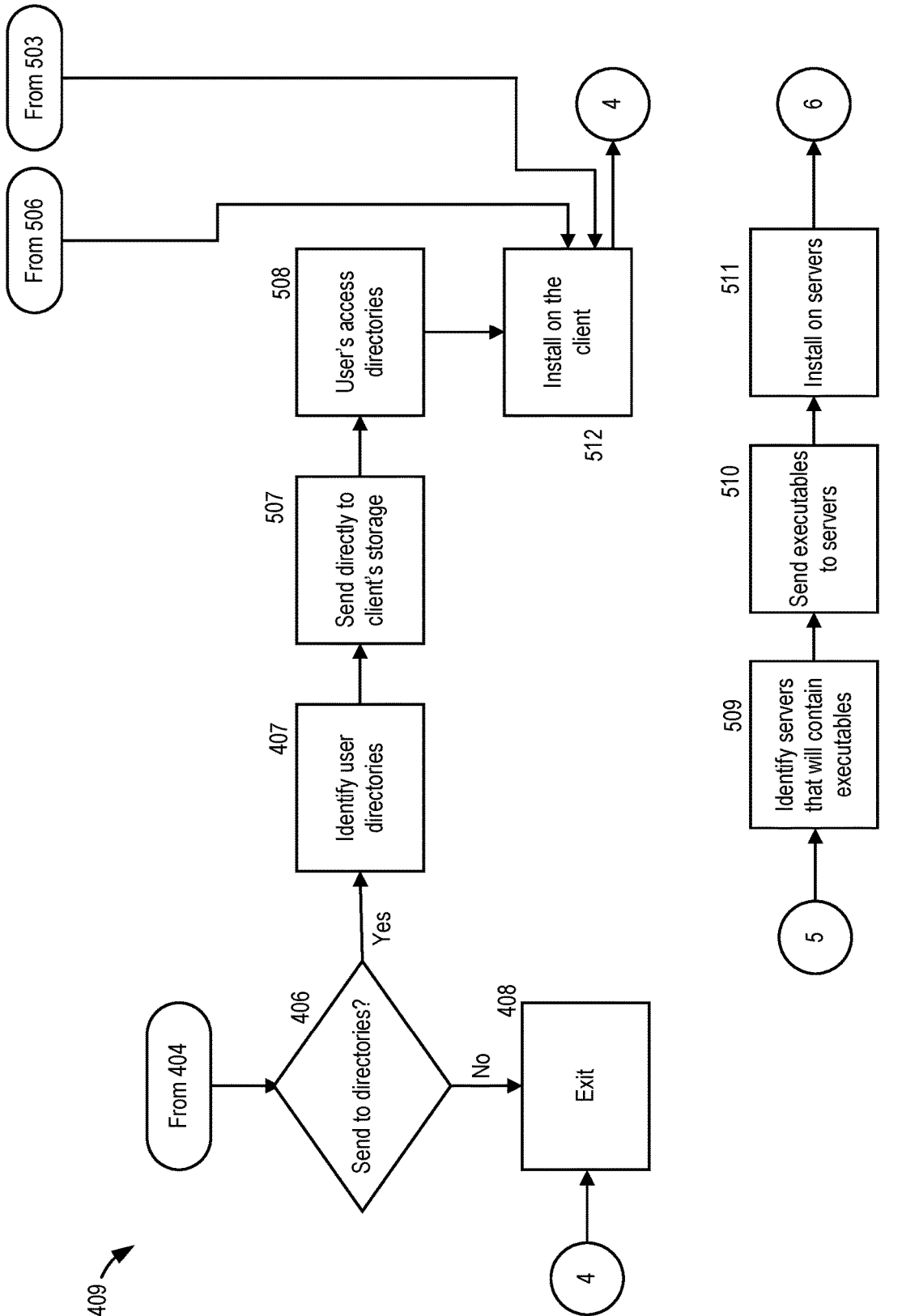

Now referring to FIG. 4, a flowchart of a method 409 is shown according to one embodiment. The method 409 may be performed in accordance with the present invention in any of the environments depicted in FIGS. 1-3B, among others, in various embodiments. Of course, more or fewer operations than those specifically described in FIG. 4 may be included in method 409, as would be understood by one of skill in the art upon reading the present descriptions.

Each of the steps of the method 409 may be performed by any suitable component of the operating environment. For example, in various embodiments, the method 409 may be partially or entirely performed by a processing circuit, e.g., such as an IaC access manager, or some other device having one or more processors therein. The processor, e.g., processing circuit(s), chip(s), and/or module(s) implemented in hardware and/or software, and preferably having at least one hardware component, may be utilized in any device to perform one or more steps of the method 409. Illustrative processors include, but are not limited to, a central processing unit (CPU), an application specific integrated circuit (ASIC), a field programmable gate array (FPGA), etc., combinations thereof, or any other suitable computing device known in the art.

While it is understood that the process software associated with automatically inspecting work items and developing a representation of how closely related the work item is to a number of different elements may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

With continued reference to method 409, step 400 begins the deployment of the process software. An initial step is to determine if there are any programs that will reside on a server or servers when the process software is executed (401). If this is the case, then the servers that will contain the executables are identified (509). The process software for the server or servers is transferred directly to the servers' storage via FTP or some other protocol or by copying though the use of a shared file system (510). The process software is then installed on the servers (511).

Next, a determination is made on whether the process software is to be deployed by having users access the process software on a server or servers (402). If the users are to access the process software on servers, then the server addresses that will store the process software are identified (403).

A determination is made if a proxy server is to be built (500) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (501). The process software is sent to the (one or more) servers either via a protocol such as FTP, or it is copied directly from the source files to the server files via file sharing (502). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (503). Another embodiment is to have the servers automatically copy the process software to each client and then run the installation program for the process software at each client computer. The user executes the program that installs the process software on his client computer (512) and then exits the process (408).

In step 404 a determination is made whether the process software is to be deployed by sending the process software to users via e-mail. The set of users where the process software will be deployed are identified together with the addresses of the user client computers (405). The process software is sent via e-mail (504) to each of the users' client computers. The users then receive the e-mail (505) and then detach the process software from the e-mail to a directory on their client computers (506). The user executes the program that installs the process software on his client computer (512) and then exits the process (408).

Lastly, a determination is made on whether the process software will be sent directly to user directories on their client computers (406). If so, the user directories are identified (407). The process software is transferred directly to the user's client computer directory (507). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (508). The user executes the program that installs the process software on his client computer (512) and then exits the process (408).

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving a new work item;
extracting topics from the new work item;
using a trained machine learning model to determine a first set of values representing correlation strengths between the new work item and the topics;
causing a set of pull requests (PRs) which are configured to solve the new work item to be produced by a confidence weighting module;
comparing the first set of values to a second set of values, the second set of values representing correlation strengths between the topics and multiple files;
generating a third set of values representing correlation strengths between the new work item and the multiple files;
using the third set of values to identify one or more PRs in the set of PRs to use to satisfy the new work item, wherein the one or more PRs are identified using the confidence weighting module;
outputting the third set of values, by:
converting the third set of values into a heatmap, and causing the heatmap to be displayed on a monitor;
in response to determining a correlation strength between the new work item and a given one of the files is in a predetermined range, using the third set of values to preload the given one of the files into cache; and
causing the new work item to be satisfied using the identified one or more PRs and the preloaded one of the files.

2. The computer-implemented method of claim 1, wherein the machine learning model is trained by:
receiving a set of work items;
extracting topics from the received set of work items;
generating a first training set of values that represent a correlation between (i) each of the work items in the received set, and (ii) each of the topics extracted from the received set of work items; and
comparing the first training set of values to PRs configured to solve each of the respective work items in the received set.

3. The computer-implemented method of claim 2, wherein training the machine learning model includes:
generating a second training set of values that represent a correlation between (i) each of the PRs configured to solve the respective work items in the received set, and (ii) each of the topics extracted from the received set of work items; and
using the second training set of values to generate the second set of values.

4. The computer-implemented method of claim 3, wherein using the second training set of values to generate the second set of values includes performing a file-to-topic association.

5. The computer-implemented method of claim 2, wherein extracting topics from the received set of work items includes using one or more trained natural language processing models.

6. The computer-implemented method of claim 5, wherein extracting topics from the new work item received includes using the one or more trained natural language processing models.

7. The computer-implemented method of claim 1, wherein generating the third set of values includes performing a topic-to-file association by:
determining a first group of correlation strengths between the multiple files and the new work item; and
determining a second group of correlation strengths between the new work item and the multiple files.

8. The computer-implemented method of claim 1, comprising:
using the first set of values representing correlation strengths between the new work item and the topics to dynamically retrain machine learning models that are configured to generate the third set of values representing correlation strengths between the new work item and the multiple files.

9. A computer program product, comprising a computer readable storage medium having program instructions embodied therewith, the program instructions readable by a processor, executable by the processor, or readable and executable by the processor, to cause the processor to:
receive a new work item;
extract topics from the new work item;
use a trained machine learning model to determine a first set of values representing correlation strengths between the new work item and the topics;
cause a set of pull requests (PRs) which are configured to solve the new work item to be produced by a confidence weighting module;
compare the first set of values to a second set of values, the second set of values representing correlation strengths between the topics and multiple files;
generate a third set of values representing correlation strengths between the new work item and the multiple files;
use the third set of values to identify one or more PRs in the set of PRs to use to satisfy the new work item, wherein the one or more PRs are identified using the confidence weighting module;
output the third set of values, by:
converting the third set of values into a heatmap, and causing the heatmap to be displayed on a monitor;
in response to determining a correlation strength between the new work item and a given one of the files is in a predetermined range, use the third set of values to preload the given one of the files into cache; and
cause the new work item to be satisfied using the identified one or more PRs and the preloaded one of the files.

10. The computer program product of claim 9, wherein the machine learning model is trained by:
receiving a set of work items;
extracting topics from the received set of work items;
generating a first training set of values that represent a correlation between (i) each of the work items in the received set, and (ii) each of the topics extracted from the received set of work items; and
comparing the first training set of values to PRs configured to solve each of the respective work items in the received set.

11. The computer program product of claim 10, wherein training the machine learning model includes:
generating a second training set of values that represent a correlation between (i) each of the PRs configured to solve the respective work items in the received set, and (ii) each of the topics extracted from the received set of work items; and
using the second training set of values to generate the second set of values.

12. The computer program product of claim 11, wherein using the second training set of values to generate the second set of values includes performing a file-to-topic association.

13. The computer program product of claim 10, wherein extracting topics from the received set of work items includes using one or more trained natural language processing models.

14. The computer program product of claim 13, wherein extracting topics from the new work item received includes using the one or more trained natural language processing models.

15. The computer program product of claim 9, wherein generating the third set of values includes:

using a file-to-topic association module to perform a file-to-topic association and determine files that are modified and/or created by the one or more PRs; and using a topic-to-file association module to perform a topic-to-file association and generate a group of confidence scores for the multiple file.

16. The computer program product of claim 9, wherein the program instructions are readable and/or executable by the processor to cause the processor to:

use the first set of values representing correlation strengths between the new work item and the topics to dynamically retrain machine learning models that are configured to generate the third set of values representing correlation strengths between the new work item and the multiple files.

17. A system, comprising:

a processor; and logic integrated with the processor, executable by the processor, or integrated with and executable by the processor, the logic being configured to:

receive a new work item;

extract topics from the new work item;

use a trained machine learning model to determine a first set of values representing correlation strengths between the new work item and the topics;

cause a set of pull requests (PRs) which are configured to solve the new work item to be produced by a confidence weighting module;

compare the first set of values to a second set of values, the second set of values representing correlation strengths between the topics and multiple files;

generate a third set of values representing correlation strengths between the new work item and the multiple files;

use the third set of values to identify one or more PRs in the set of PRs to use to satisfy the new work item, wherein the one or more PRs are identified using the confidence weighting module;

output the third set of values, by:

converting the third set of values into a heatmap, and causing the heatmap to be displayed on a monitor;

in response to determining a correlation strength between the new work item and a given one of the files is in a predetermined range, use the third set of values to preload the given one of the files into cache; and cause the new work item to be satisfied using the identified one or more PRs and the preloaded one of the files.

18. The system of claim 17, wherein the machine learning model is trained by:

receiving a set of work items;

extracting topics from the received set of work items;

generating a first training set of values that represent a correlation between (i) each of the work items in the received set, and (ii) each of the topics extracted from the received set of work items; and comparing the first training set of values to PRs configured to solve each of the respective work items in the received set, wherein the logic is further configured to:

use the first set of values representing correlation strengths between the new work item and the topics to dynamically retrain machine learning models that are configured to generate the third set of values representing correlation strengths between the new work item and the multiple files;

generate a second training set of values that represent a correlation between (i) each of the PRs configured to solve the respective work items in the received set, and (ii) each of the topics extracted from the received set of work items; and use the second training set of values to generate the second set of values, wherein using the second training set of values to generate the second set of values includes performing a file-to-topic association, wherein generating the third set of values includes:

using a file-to-topic association module to perform a file-to-topic association and determine files that are modified and/or created by the one or more PRs; and using a topic-to-file association module to perform a topic-to-file association and generate a group of confidence scores for the multiple file.

* * * * *